Nov. 2, 1971   H. T. PECK ET AL   3,616,500
MEANS FOR FORMING GASKET GROOVES IN CONCRETE PIPE SPIGOTS
Filed Oct. 22, 1969   5 Sheets-Sheet 3

INVENTORS
Harry T. Peck
Harold W. Schneider
BY
Ehley & Ehley
ATTORNEYS

United States Patent Office 3,616,500
Patented Nov. 2, 1971

3,616,500
MEANS FOR FORMING GASKET GROOVES IN CONCRETE PIPE SPIGOTS
Harry T. Peck and Harold W. Schneider, Arlington, Tex., assignors to Gifford-Hill Pipe Company, Dallas, Tex.
Continuation-in-part of application Ser. No. 796,118, Feb. 3, 1969. This application Oct. 22, 1969, Ser. No. 871,509
Int. Cl. B28b 21/00
U.S. Cl. 25—39
32 Claims

ABSTRACT OF THE DISCLOSURE

Method of and means for forming gasket-receiving grooves in concrete or cement asbestos pipe spigots having a split groove-forming ring engaged in a channel between a pair of spigot-forming members and of less internal and external diameters than the channel for contraction and expansion into and out of operative position, the ring and members being adapted to undergo limited rotation relative to a spigot and its groove for breaking the adhesion of the concrete thereto. The invention includes means for circulating a cleansing fluid through its channel and around the expanded ring to prevent setting up of cement.

BACKGROUND OF THE INVENTION

Field of the invention

Method of and means for forming gasket-receiving grooves in concrete pipe spigots.

This application is a continuation-in-part of our copending application Ser. No. 796,118, filed Feb. 3, 1969, now abandoned.

Description of the prior art

In recent years, the concrete pipe industry has developed various types of seals for pipe joints to prevent leakage from within as well as from without pipes. Among these seals have been a number of gasket configurations, of rubber, plastic and other suitable material, for sealing off between the bell and spigot ends of pipe and much difficulty has been encountered when the gaskets are merely frictionally engaged on pipe spigots by slipping on and stretching of said gaskets whereby the latter tend to slip off. In order to prevent lateral displacement of the gaskets, it has become customary to provide grooves in the spigots for confining portions of said gaskets therein.

The spigot grooves have been formed in many different manners, one of which is by means of a two-piece ring having identical halves which are removed radially from said grooves. Other split rings used to form the grooves consist of three or more segments held together so as to provide an annular mold and being removed radially. Manifestly, split rings may be removed from the grooves before or after initial setting of the concrete. Another method of forming spigot grooves is by snap rings for removal from the grooves. Sometimes the retainers for the rings have spigot forming faces and, other times, said retainers are in the nature of plastic snap rings which may be sprung open for removal from the groove-forming snap rings.

SUMMARY OF THE INVENTION

A novel method of and means for forming gasket-receiving grooves in the spigots of concrete or cement asbestos pipe which includes a split, annular groove former or groove-forming ring engaged in a channel between a pair of members having spigot-forming faces. The ring is of less internal and external diameters than the channel, being adapted to contract or be contracted and expanded into and out of operative position and to undergo slight rotation relative to the members for breaking the adhesion of the concrete to said ring. Complete expansion of the ring frictionally engages its external periphery with the members whereby continued rotation of said ring imparts rotation to said members for breaking the adhesion of the concrete thereto. The channel has at least one inlet and a plurality of outlets for the circulation of a cleansing fluid therethrough and around the expanded ring to prevent the setting up of the cement on the surfaces of said channel and ring.

The apparatus is suspended from a concrete hopper for engagement with the upper end of an upright pipe mold and is adapted to be withdrawn, by lifting of the hopper, from the pipe spigot upon completion of the aforesaid rotation and prior to the circulation of the cleansing fluid. Before the apparatus is engaged with another pipe mold, the groove former or groove-forming ring is contracted or permitted to contract so as to project inwardly of the spigot-forming faces of the members.

It may be, and frequently is, highly desirable to rotate the groove former or ring and members to break the concrete adhesion prior to expanding and retracting said ring. In this event, means are provided for connecting the ring to at least one of the members and preventing relative rotation of said ring whereby said members and ring rotate together. After limited rotation of the ring and members, the connection is broken so as to permit expansion and retraction of said ring into inoperative position. When the ring is returned to operative position, it is again connected to at least one of the members.

A construction designed to carry out the invention will be described hereinafter, together with other features of the invention.

BRIEF DESCRIPTION OF THE DRAWINGS

FIG. 11 is an enlarged, fragmentary, sectional view of a portion of the grooved pipe spigot.

DESCRIPTION OF THE PREFERRED EMBODIMENTS

In the drawings, the numeral 1 designates a more or less conventional upright mold for forming a concrete or cement asbestos pipe P and having an external reinforcing collar 2 welded to its upper end. The mold 1 is adapted to receive concrete from a hopper 3, a portion of which is shown in broken lines, and to coact with a packer head (not shown) in compacting the concrete into tubular form. For forming the spigot S of the pipe P as well as the external, annular, gasket-receiving groove G (FIGS. 6–11) of said spigot, an apparatus 4 is provided for mounting on the frusto-conical lower end of the hopper 3 and for engaging the reinforced upper end of the pipe mold. The apparatus 4 includes an annular top plate or flat ring 5 for attachment to the overlying, complementary bottom or flange plate 6, shown in broken lines, of the hopper as well as to an underlying assembly holder ring 7 by a plurality of bolts and nuts 8. The assembly holder ring 7 is of greater internal diameter than the plate 5 and has rotatably nested therein a complementary, annular wear plate holder or ring 9 which is angular in cross-section and of substantially the same axial thickness as said assembly holder ring.

Desirably, an annular, flat sealing ring 10 is confined between the underside of the top plate and the topside P of the ring 7 and holder 9 to seal off between said ring and holder. An internal, annular recess 11, of much greater radial width than axial depth, is provided in the underside of the wear plate holder 9 for receiving a complementary, annular wear plate or flat ring 12. Preferably, the wear plate 12 has an internal diameter slightly less than its holder and slightly greater than the bore of the pipe P. An external recess 13, similar to the recess 11, is formed in the underside of the wear plate for engagement by the upper margin of an upper, annular, spigot forming plate or collar 14 whereby said wear plate is clamped between its holder and the forming plate. As shown at 15, the underside of the assembly holder ring 7 is internally recessed for receiving the upper margin of the upwardly offset, outer, peripheral flange 16 of the plate 14 which underlies the wear plate 12 as well as its holder 9.

A complementary flat retaining ring or collar 17 surrounds and rotatably confines the flange 16 of the upper forming plate 14, being secured by bolts and nuts 18 in underlying relation to the assembly holder ring 7 which is recessed or stepped at 19 contiguous its internal recess 15 for engagement by the upper margin of the retaining collar. Below the collar 17, each of the bolts and nuts 18 carries a flat lug 20 (FIGS. 1 and 3–6) which extends inwardly of said collar so as to underlie the offset flange of the upper forming plate and support said plate. A lower, annular, spigot-forming plate or collar 21 underlies the upper plate 14 and is of substantially the same external diameter so as to form a continuation thereof. As shown at 22, the upper forming plate is upset and lower forming plate may be recessed at their outer margins to ensure alinement of said plates. It is noted that the internal diameters of the forming plates are greater than the internal diameters of the wear ring and its holder and less than the bore of the pipe mold and that said forming plates and holder are suitably secured to one another. For centering the apparatus 4 relative to the mold 1, the lower forming plate 21 has a plurality of upright, equally-spaced lugs 23 depending therefrom so as to encircle the reinforced upper end of said mold. Due to the described arrangement, the wear plate holder 9, wear ring 12 and the forming plates 14 and 21 are rotatable together relative to the top plate 5, assembly holder ring 7 and retaining collar 17.

Figures 4, 5, 10, 12:
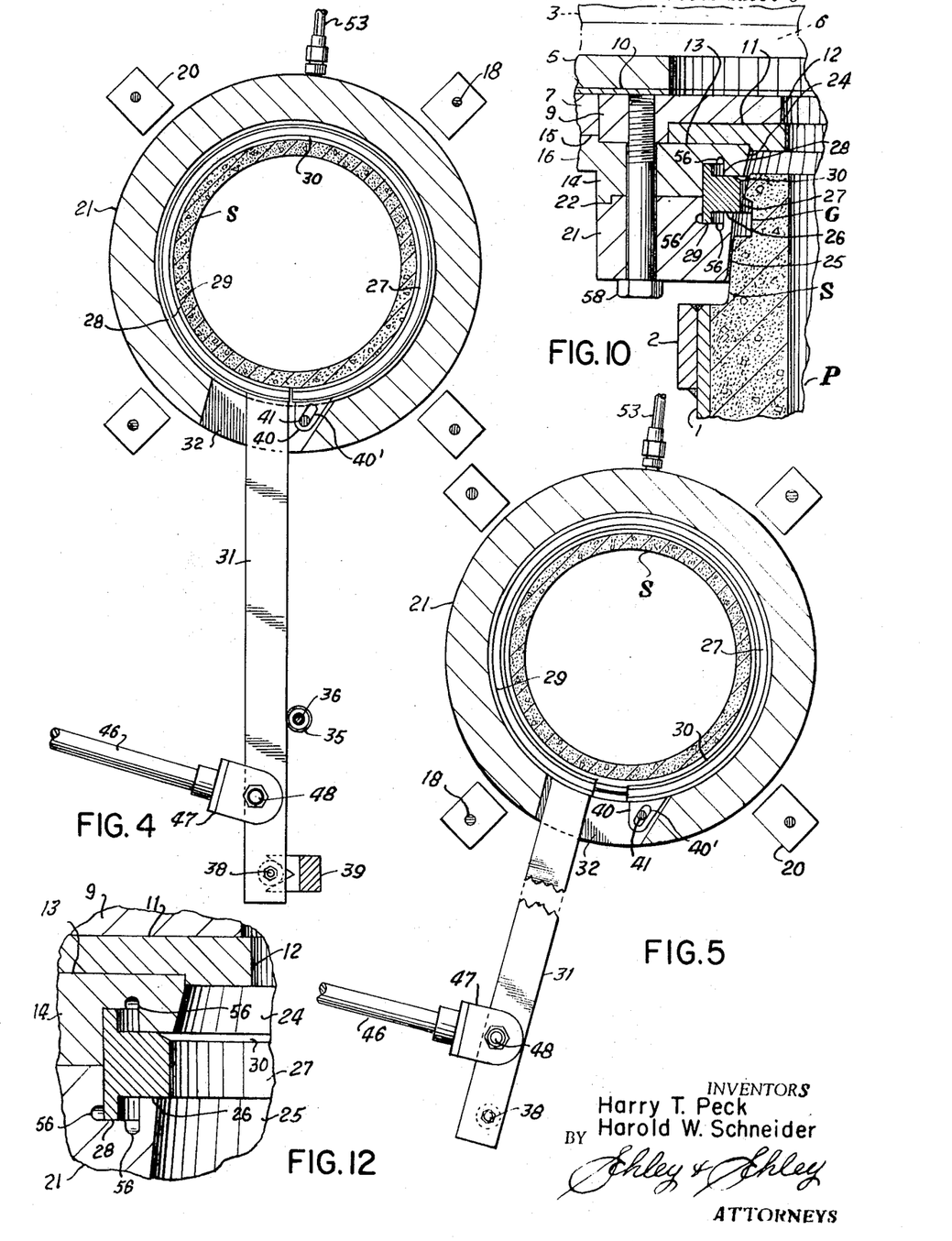
FIG. 4 is a horizontal, cross-sectional view, taken on the line 4—4 of FIG. 1, showing the apparatus in operative position.
FIG. 5 is a view, similar to FIG. 4, showing the apparatus in inoperative position.
FIG. 10 is an enlarged, fragmentary, vertical, sectional view showing the apparatus in nonoperating position and partially withdrawn from the pipe spigot.
FIG. 12 is an enlarged, fragmentary, vertical, sectional view of the groove former and the adjacent portions of the spigot forming members.
Figure 6:
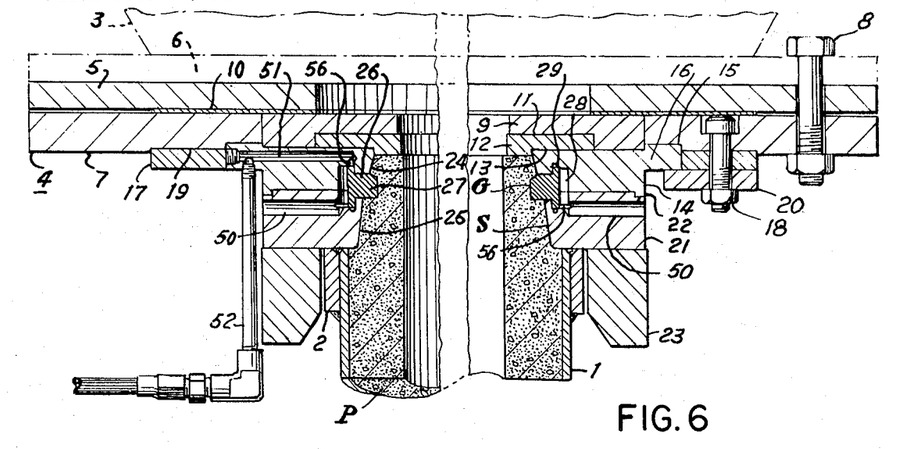
FIG. 6 is an enlarged, broken, transverse, vertical, sectional view taken on the line 6—6 of FIG. 3, FIGS. 7, 8 and 9 are enlarged, fragmentary, vertical, sectional views taken on the lines 7—7, 8—8 and 9—9, repsectively, of FIG. 3.
Figures 7, 8, 9, 11:
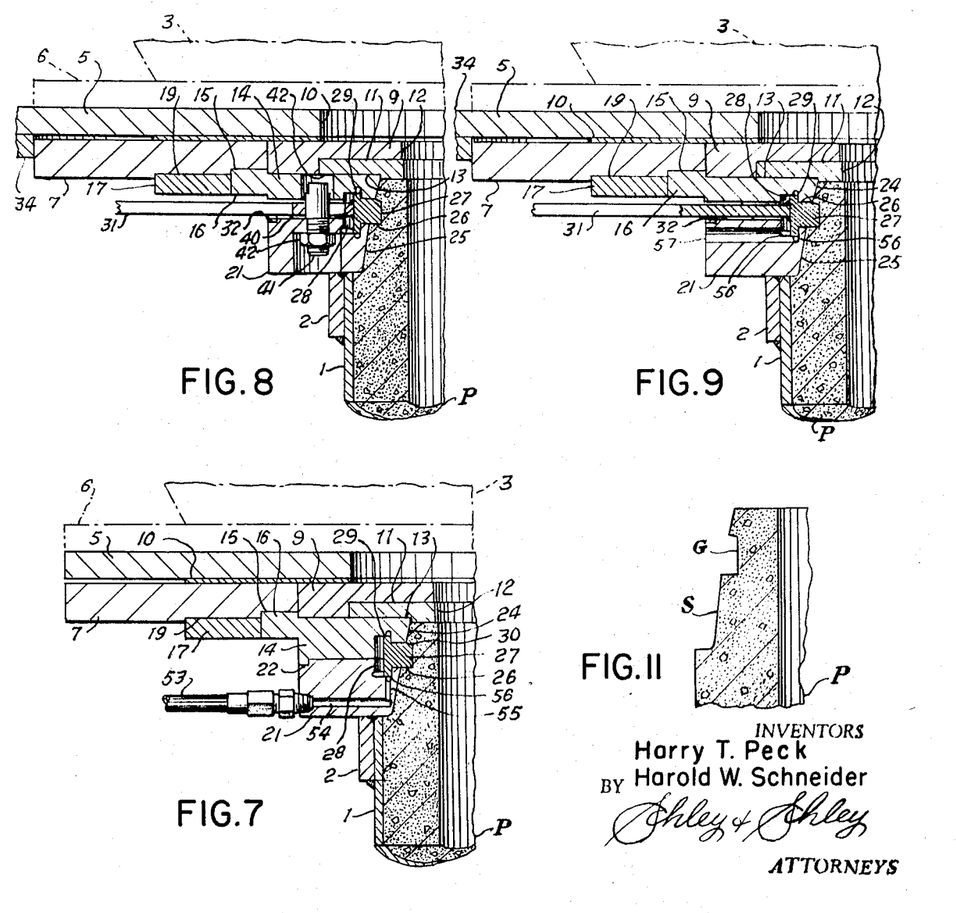

Upwardly-convergent, frustro-conical, inner faces 24 and 25 are provided on the upper and lower forming plates 14 and 21, respectively, to form the external, tapered, stepped surfaces of the pipe spigot S, the face 24 of said upper plate having a slightly greater inward inclination than the face 25 and being stepped inwardly thereof. In order to permit forming of the groove G of the pipe spigot, complementary, annular, internal recesses 26 are provided in the contiguous, inner margins of the forming plates and coact to form an annular channel which is adapted to contain a split, annular groove former or groove-forming ring 27 of resilient metal. The inner portions of the recesses 26 are axially enlarged to provide annular grooves 28 and the groove former 27 has alined, annular flanges 29 projecting upwardly and downwardly from its outer periphery for confining engagement within the grooves. The channel formed by the recesses is of greater internal and external diameters than the groove former and the grooves 28 of said recesses are of greater radial width than the flanges 29 of said groove former, whereby the latter projects inwardly of the inner faces 24 and 25 of the forming paltes 14 and 21 and may be expanded and retracted outwardly into said channel to permit withdrawal of the apparatus from the pipe spigot (FIG. 10). Preferably, the upper inner margin of the groove former 27 is bevelled or chamfered as shown at 30 to facilitate withdrawal of said groove former from the spigot groove.

Figure 1:
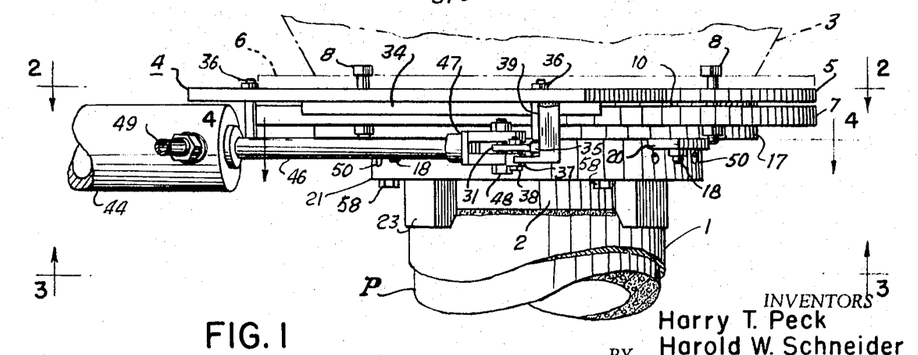
FIG. 1 is a side elevational view of a groove-forming apparatus constructed in accordance with the invention and engaging the upper end of a pipe mold in surrounding relation to the spigot of a concrete pipe, a portion of the supporting hopper being shown in broken lines.
Figure 2:
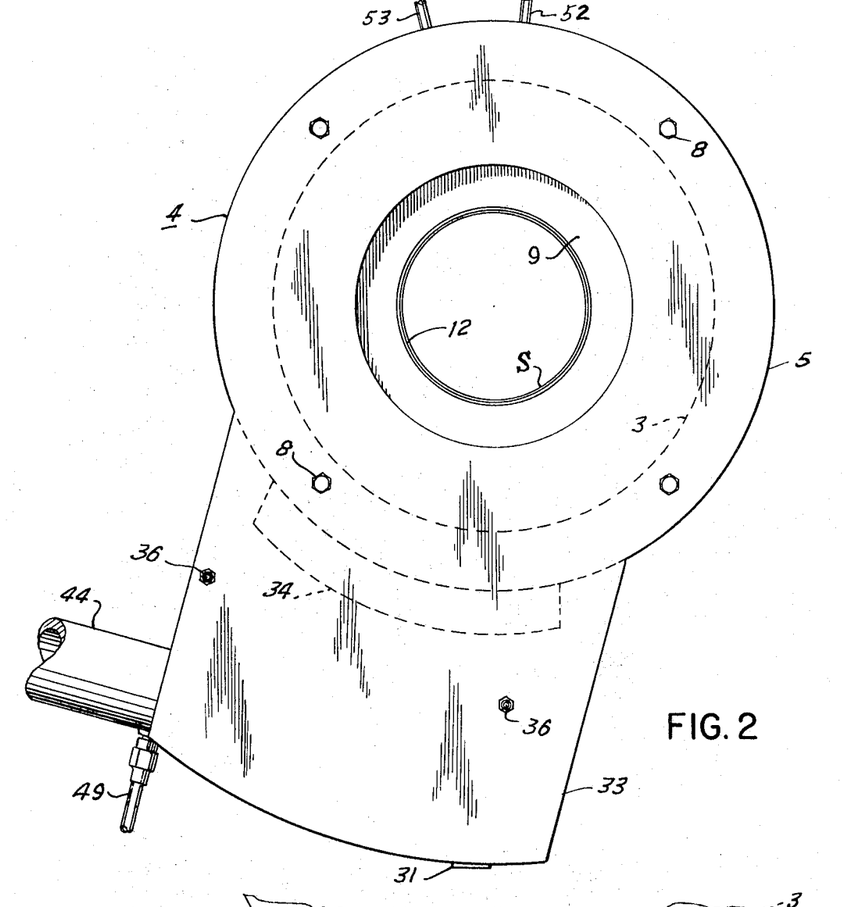
FIG. 2 is a top plan view of the apparatus, taken on the line 2—2 of FIG. 1.

A coplanar, actuating handle 31 is secured to the periphery of the groove former adjacent and clockwise of its bifurcation so as to project outwardly of said groove former (FIGS. 4, 5, 8 and 9) and a slot 32 for accommodating lateral swinging movement of the handle is provided by recessing the outer portions of the contiguous surfaces of the forming plates 14 and 21 outwardly of their recesses 26. The handle 31 underlies a parallel, mounting plate 33 which projects laterally from an in coplanar relation to the top plate 5 (FIGS. 1–3) and which may have its inner margin reinforced by an underlying, arcuate plate 34. For limiting the movement of the handle, a pair of rollers 35 are confined on the lower ends of a pair of bolts and nuts 36 depending from the mounting plate 33 adjacent its opposed lateral margins. Another roller 37 may underlie the outer end of the handle 31, being fastened thereto by a bolt and nut 38, for engagement with an angular stop 39, which depends from the mounting plate adjacent its outer margin, simultaneously with the engagement of said handle with the clockwise roller 35 of FIG. 3 to prevent misalinement of the inner peripheral portions of the adjacent ends of the groove former 27. The groove former is loosely connected to the lower forming plate 21 by an integral slotted ear or lug 40 (FIGS. 4 and 5) projecting laterally from the counter-clockwise end of said groove former into the slot 32. A pin 41 upstands from the lower forming plate and has its lower end portion reduced and screw-threaded for receiving a nut 42 (FIGS. 3 and 8), the upper end portion of the pin extending through the slot 40′ of the lug 40 into an opening 43 in the upper forming plate 14, whereby the groove former 27 is expanded when the handle is swung clockwise from the position shown in FIG. 4 to the position shown in FIG. 5.

Although the handle may be manipulated in any suitable manner, it is preferred to utilize a pneumatic or other pressure fluid operating cylinder 44 (FIGS. 1–5) having the usual piston 45 and piston rod 46. A clevis 47 is mounted on the outer end of the piston rod 46 for connection by a bolt and nut 48 to the handle inwardly of its roller 37. Of course, the piston 44 is provided with conventional fluid lines, one of which is shown at 49. After the expansion of the groove former 27, it is most desirable to inject a cleansing mixture of air and diesel, or other suitable, oil into the recesses 26 of the forming plates 14 and 21 which form the channel for said groove former. In addition to removing cement, sand and other foreign matter, the injection of the mixture kills the cement and prevents it from setting up or caking.

Figures 3, 13:
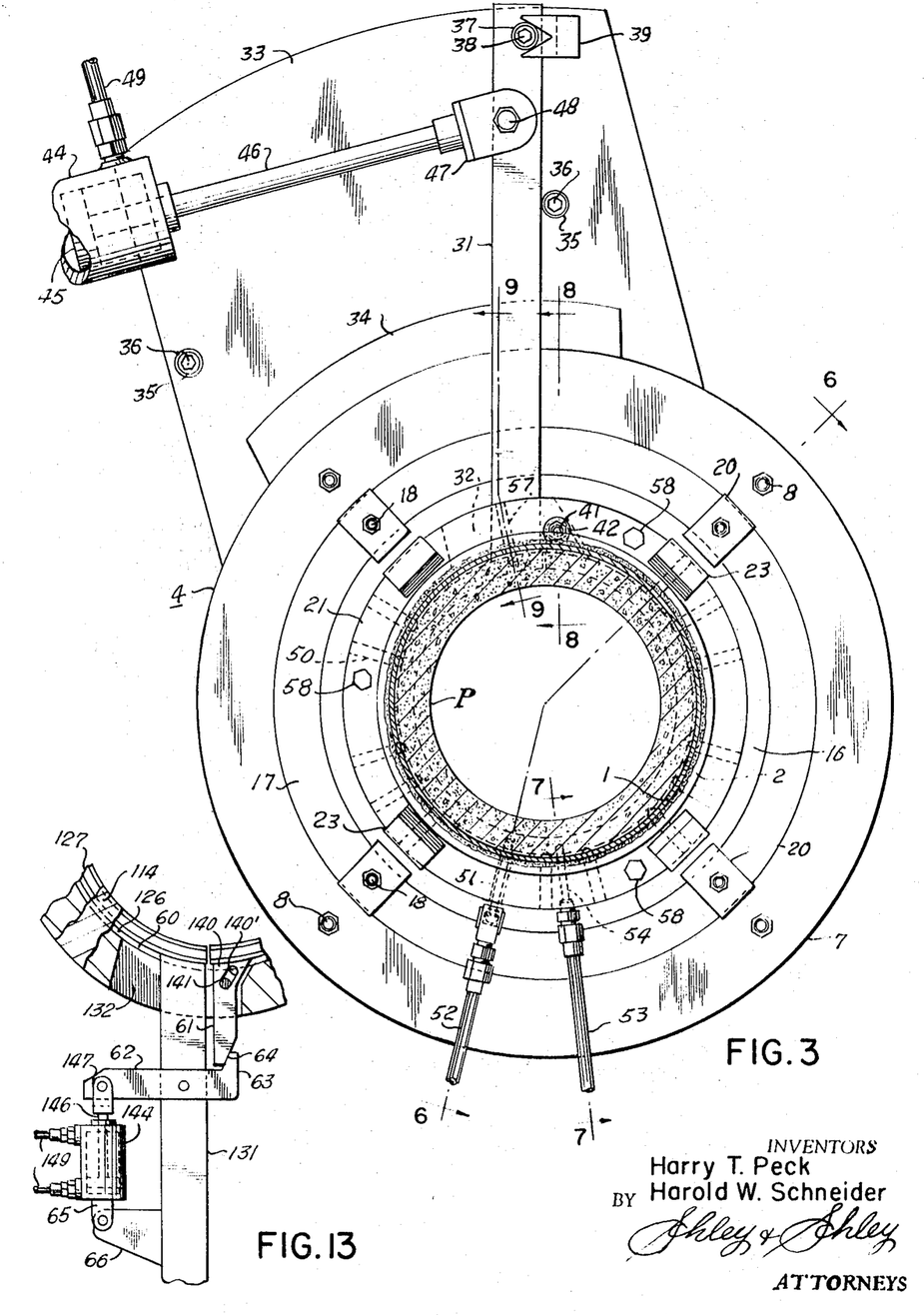
FIG. 3 is an enlarged, horizontal, cross-sectional view, taken on the line 3—3 of FIG. 1, showing the apparatus in operative position.
FIG. 13 is an enlarged, fragmentary, horizontal, cross-sectional view of a modification adapted to simultaneously rotate the groove former and spigot-forming members prior to expansion and retraction of such groove former into inoperative position.

Exhaust ports 50 (FIGS. 1 and 6) extend radially through the lower forming plate and have their inner ends communicating with the groove 28 of the recess 26 of said plate to permit the escape of the cleansing mixture. The upper forming plate 14 has a radial, inlet port 51 (FIG. 6) establishing communication between the groove 28 of its recess 26 and a supply conduit 52 for injecting the mixture. If desired, a second supply line 53 may communicate through a radial port 54 (FIG. 7) in the lower forming plate 21 with the groove of said plate, the port having an upright portion 55 extending upwardly to said groove. As shown at 56 in FIGS. 6-12, small, annular channels or grooves are in coextensive communication with the grooves 28 of the forming plates to ensure circulation of the cleansing mixture throughout the recesses 26 and over the external surfaces of the groove former 27. One of the channels 56 is provided at the bottom of each groove, at its inner margin, so as to overlie the upper groove and underlie the lower groove (FIG. 12) and the third channel 56 is disposed externally of the bottom portion of the lower groove. It is noted that the upper inner channel (FIG. 6) communicates with the inlet port 51, the lower inner channel (FIG. 7) with the inlet port 54, 55, and the external bottom channel (FIG. 6) with the exhaust ports 50. In addition, both the lower inner and external bottom channels (FIG. 9) are in communication with an exhaust port 57, of greater length than the ports 50, extending through the lower forming plate below the slot 32 and in opposed relation to the inlet ports 51 and 54 (FIG. 3). The forming plates 14 and 21 may be secured to each other and to the wear plate holder 9 by bolts 58 (FIGS. 3 and 10) extending upwardly through said plates and screwthreaded in said holder.

When the hopper 3 is lowered to engage the apparatus 4 with the pipe mold 1 and its reinforcing collar 2, the piston rod 46 is extended so as to dispose the handle 31 in the position shown in FIGS. 1-4, 8 and 9 whereby the inner portion of said handle is adjacent the slotted lug 40 (FIGS. 3, 4 and 8) of the annular groove former 27 and said groove former is contracted and/or permitted to contract (FIGS. 4 and 6-9) so as to project inwardly of the inner faces 24 and 25 of the upper and lower annular forming plates 14 and 21 with the flanges 29 of said groove former engaging the inner peripheral surfaces of the grooves 28 of the recesses 26 of said forming plates. Upon completion of the compaction of the concrete to form the pipe P within the mold and the spigot S within the apparatus, the cylinder 44 is actuated so as to retract the piston rod and swing the handle from the position shown in FIGS. 1-4 to the position shown in FIG. 5. It is noted that the underside of the wear plate 12 forms the end face of the pipe spigot.

Due to the engagement of the pin 41 within the slot 40 of the lug, this swinging of the handle 31 imparts only slight rotational movement to the groove former whereby the latter is expanded and retracted into the channel formed by the recesses 26 (FIGS. 5 and 10) with the external periphery of said groove former, including its flanges, in engagement with the outer peripheral surfaces of the grooves 28 which also form the outer peripheries or bottoms of the recesses 26. This turning of the groove former 27 facilitates its removal from the groove G of the pipe spigot and prevents damaging of the contiguous surfaces of the concrete which tend to adhere to said groove former. It is noted that the slot of the lug 40 extends tangentially of the groove former toward the handle and, in coaction with the pin, functions as a wedge to restrict rotation of said groove former upon expansion of the latter.

When sufficient area of contact is made between the surfaces of the forming plates 14 and 21 and of the groove former 27, continued rotation of said groove former by swinging of the handle 31 is transmitted to said forming plates whereby the latter turn relative to the spigot S and the inner faces 24 and 25 of said plates slide circumferentially of the surfaces of said spigot and break the adhesion of the concrete to said faces so as to prevent damaging of said spigot surfaces upon lifting of the hopper 3 and withdrawal of the apparatus 4. Since the wear plate holder 9 is secured to the forming plates by the bolts 58 and the wear plate 12 is clamped between the upper forming plate and holder, said wear plate and its holder rotate with said forming plates relative to the top plate 5, assembly holder ring 7 and retaining collar 17 to prevent damaging of the outer end surface of the spigot upon disengagement of said wear plate therefrom. Due to the frusto-conical contour and stepping of the spigot-forming faces of the forming plates 14 and 21, it is unnecessary to retract the groove former entirely within the channel formed by the recesses 26 in order for said groove former to clear the larger inner portion of the spigot upon withdrawal of the apparatus.

Upon completion of the aforesaid rotation and during initial lifting of the hopper 3 to withdraw the apparatus 4, the cleansing mixture is circulated through the inlet ports 51 and 54, grooves 28 and channels 56 and escape through the exhaust ports 50 and 57 (FIGS. 6-9) so as to wash the recesses 26 as well as the groove former 27 and prevent the setting up of the cement on the surfaces thereof. It is preferable for the lower forming plate 21 to lightly engage and not rest upon the upper end of the pipe mold 1 whereby the frictional engagement of the expanded groove former 27 with the forming plates is sufficient to imaprt the rotation of said groove former to said plates. It is contemplated, however, that it may be necessary or desirable to raise the hopper a very slight distance so as to remove its weight as well as the weight of the apparatus from the forming plates and permit rotation thereof with the expanded groove former.

It is further contemplated that external means (not shown) may be provided for imparting rotation to the forming plates 14 and 21 or for assisting rotation of said plates by the groove former 27. Also, it is readily apparent that the groove former and forming plates could, and preferably may, be rotated to break the cement adhesion prior to expanding and retracting said groove former. After the apparatus 4 is withdrawn from the pipe spigot S and before it is engaged with another mold, the cylinder 44 is actuated so as to return the handle 31 to its original position (FIGS. 1-4) and contract the groove former (FIGS. 6-9) into its inwardly projecting position. It is noted that the forming plates coact to provide a spigot mold or spigot forming body and that said plates could be permanently secured together except for the necessity of repair and/or replacement of the groove former.

A modified embodiment of the invention for simultaneously rotating the groove former and forming plates prior to expansion and retraction of said groove former into inoperative position is shown in FIG. 13. This embodiment includes upper and lower, annular, spigot-forming plates or collars 114 and 121, a split, annular groove former or groove forming ring 127 engaged in a peripheral channel 60 formed by complementary, annular, internal recesses 126 provided in the contiguous, inner margins of the forming plates, an actuating handle 131 coplanar with and secured to said groove former so as to project outwardly thereof, and an external slot 132 communicating with the channel to accommodate lateral swinging of the handle. Since the foregoing are substantially identical to the forming plates 14 and 21, groove former 27, recesses 26, handle 31 and slot 32 of the first embodiment, it is believed necessary to describe only the differences of construction.

An ear or lug 140, similar to the lug 40 and having a similar slot 140' extending tangentially of the groove former 127, projects into the slot from the counterclockwise end of said groove former for loosely connecting the latter to the lower forming plate 121 by means of an upright pin 141 which may be identical to the pin 41. The lug 140 is of greater length and has a rectangular portion or arm 61, of extended length, in adjacent parallel relation to the inner portion of the handle 131 when the groove former is contracted into operative position. A lever 62 is pivotally attached to the handle and has a lateral projection or hook 63 extending inwardly from its counterclockwise end for engaging and latching the arm 61 of the lug to said handle. As shown at 64, it is desirable to bevel the contiguous surfaces of the arm and hook to facilitate engagement and disengagement thereof.

A pneumatic or other pressure fluid operating cylinder 144, similar to the cylinder 44 and having a similar piston rod 146 and fluid lines 149, is provided for actuating the lever 62. The cylinder 144 has an apertured ear or lug 65 projecting from its closed end for pivotal attachment to a mounting bracket 66 which extends laterally clockwise from the handle 131. A clevis 147, similar to the clevis 47, is connected to the outer end of the piston rod 146 for pivotally fastening said rod to the clockwise end of the lever. Due to the latching of the lug 140 to the handle by the engagement of the hook 63 of the lever 62 with the arm 61 of said lug, expansion of the groove former 127 is prevented upon clockwise swinging of said handle and such swinging causes clockwise rotation of said groove former. Since the forming plates are secured together in the same manner as the plates 14 and 21 and the lower forming plate is connected to the groove former lug by the pin 141 and slot 140', the rotation of the groove former is transmitted to said forming plates prior to expansion and retraction of said groove former into inoperative position.

Upon sufficient rotation to break the adhesion of the concrete to the forming plates 114 and 121 and groove former 127, the cylinder 144 is actuated to extend its piston rod 146 for pivoting the lever clockwise and disengaging its hook from the arm of the lug 140. Due to this release, the groove former is expanded and retracted upon continued clockwise swinging of the handle 131. After withdrawal from a pipe spigot and before engagement of the modified apparatus with another pipe mold, the handle is returned to its original position (FIG. 13) for ensuring contraction of the groove former 127 into operative position. Also, the cylinder 144 is actuated to retract its piston rod and pivot the lever 62 counterclockwise for latching engagement of its hook 63 with the lug arm 61.

Figure 14:
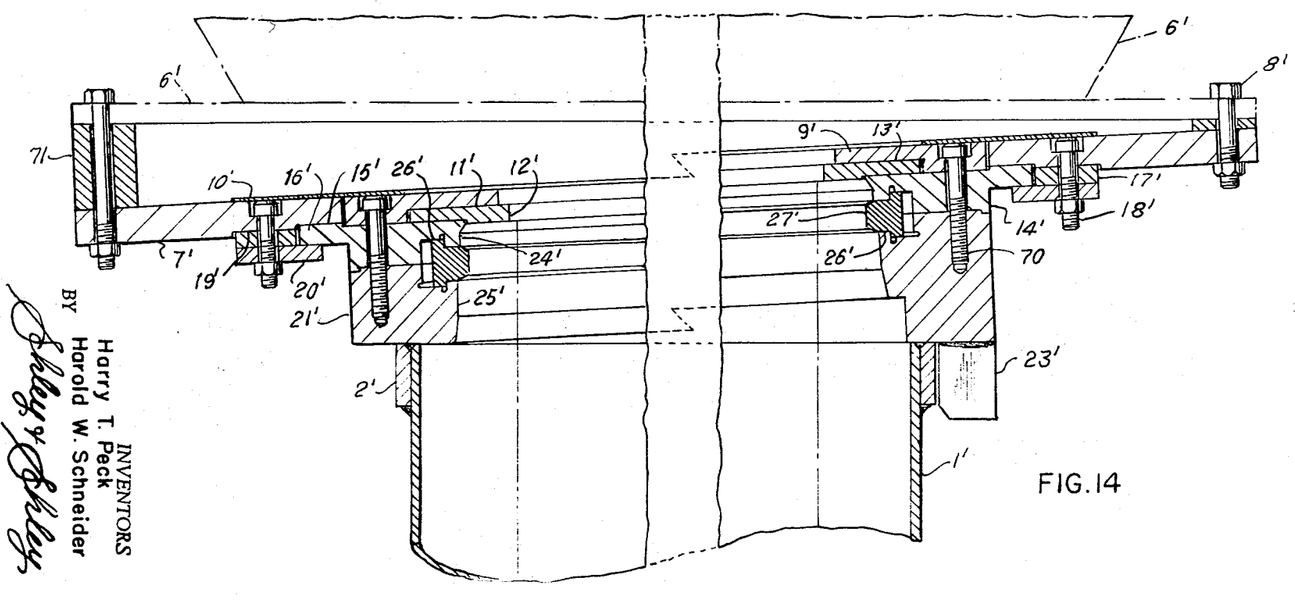
FIG. 14 is an enlarged, broken, transverse, vertical, sectional view of another modification for disposing the groove former and spigot-forming members at an acute angle to the longitudinal axis of the pipe.
Figure 15:
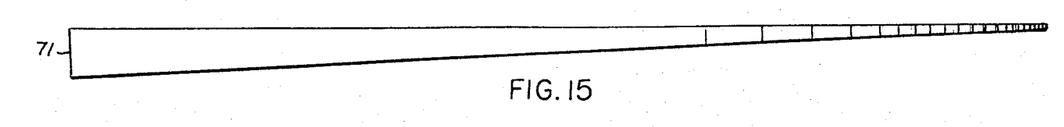
FIG. 15 is a side elevational view of the annular, tapered shim which compensates for the angular relationship of the groove former and spigot-forming members.
Figure 16:
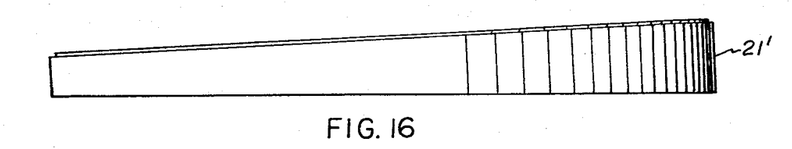
FIG. 16 is a side elevational view of the lower or inner spigot-forming member.

Another modified embodiment of the invention is shown in FIGS. 14–16 and is adapted to form a spigot and a gasket-receiving groove at an acute angle to the longitudinal axis of the pipe. Since most of the elements of this modification are identical to the elements described hereinbefore, prime numerals will be employed to identify the same. Assembly holder ring 7' is fastened by bolts and nuts 8' to the bottom flange 6' of the hopper 3' and has annular wear plate holder 9' nested therein for receiving wear plate 12' in its underside, internal, annular recess 11'. Upper, annular, spigot-forming plate or collar 14' underlies the wear plate 12' and its holder 9', being engaged in the external, underside recess 13' of said wear plate and having its upwardly offset, outer, peripheral flange 16' rotatably confined in the underside, internal recess 15' of the assembly ring holder 7'. Complementary, flat retaining ring or collar 17' surrounds and rotatably confines the flange 16' of the upper forming plate 14' and is secured by bolts and nuts 18' to the underside of the holder 7' which is recessed or stepped at 19', the bolts and nuts carrying flat lugs 20' which extend inwardly beneath said flange 16' so as to support said plate 14'.

A lower, annular, spigot-forming plate or collar 21' underlies the upper plate 14' and is tapered between diametrically opposed high and low points so as to extend at an acute angle to the longitudinal axis of the hopper 3' as well as the pipe mold 1'. Except for its taper the forming plate 21' is identical to the plate 21 and has similar centering lugs 23' depending therefrom for coacting with the reinforcing collar 2' of the pipe mold. It is noted that the taper is not and need not be of appreciable magnitude, being shown as 2°40', since a plurality of pipes having angled spigots may be employed to form a bend or curve. In addition to upwardly-convergent, frusto-conical, spigot-forming faces 24' and 25', the plates 14' and 21' have complementary, annular, internal recesses 26' in their contiguous, inner margins to receive a split, annular groove former or groove forming ring 27'. Since the channel formed by the coaction of the recesses 26' as well as the groove former 27' are both identical to the channel of the first embodiment, it is believed unnecessary to describe the same in detail. Preferably, the lower spigot-forming plate 21' is secured to the wear plate holder 9' by a plurality of bolts 70 whereby the upper plate 14' is confined therebetween, and flat sealing ring 10' is suitably confined in overlying relation to the bolts as well as the bolts 18' and the space between the assembly holder ring 7' and wear plate holder 9'. In order to dispose this modified apparatus at an angle to both the pipe mold 1' and hopper 3', a tapered, annular shim 71 is confined upon the bolts 8' between the bottom flange of said hopper and the assembly holder ring. Of course, the shim 71 has the same taper as the lower forming plate 21'.

The foregoing description of the invention is explanatory thereof and various changes in the size, shape and materials, as well as in the details of the illustrated construction may be made without departing from the spirit of the invention.

What is claimed is:

1. An apparatus for forming gasket receiving grooves in concrete and similar pipe spigots including
    a body having a frusto-conical opening extending therethrough to provide an annular inner face for forming the tapered surfaces of pipe spigots,
    external means rotatably confining the body,
    the annular inner face of said body having a peripheral channel intermediate the margins of said face,
    a split annular groove former engaged in the channel and of less internal and external diameters than said channel whereby the groove former is contractable into groove forming position and expansible into a retracted position,
    means for imparting limited rotation to said body and groove former relative to the pipe spigot and its gasket receiving groove for breaking the adhesion of the concrete thereto,
    means for loosely confining said groove former in said channel so as to permit expansion and contraction thereof,
    means for moving said groove former between its contracted and expanded positions.

2. A groove forming apparatus as defined in claim 1 wherein the means for loosely confining the groove former in the channel of the body permits limited relative rotation thereof as well as frictional engagement with a bottom surface of said channel upon expansion of said groove former,
    the means for imparting limited rotation to said body and groove former being connected to said groove former whereby the rotation of the latter is transmitted to said body by the frictional contact therebetween.

3. A groove forming apparatus as defined in claim 1 including
    means for supplying a cleansing fluid to the channel of the body for washing the surfaces thereof as well as of the groove former and preventing setting up of cement on said surfaces, the body having an inlet port communicating with the supply means and channel and a plurality of exhaust ports in communication with said channel.

4. A groove forming apparatus as defined in claim 1 wherein the body includes a pair of coacting members having contiguous surfaces in which inner annular recesses are provided to form the channel of said body, each of the coacting members having an annular inner surface forming a part of the annular inner face of said body.

5. A groove forming apparatus as defined in claim 2 including means for supplying a cleansing fluid to the channel of the body for washing the surfaces thereof as well as of the groove former and preventing setting up of cement on said surfaces, the body having an inlet port communicating with the supply means and channel and a plurality of exhaust ports in communication with said channel.

6. A groove forming apparatus as defined in claim 2 wherein the body includes a pair of coacting members having contiguous surfaces in which inner annular recesses are provided to form the channel of said body, each of the coacting members having an annular inner surface forming a part of the annular inner face of said body.

7. A groove forming apparatus as defined in claim 4 including means for supplying a cleansing fluid to the channel of the body for washing the surfaces thereof as well as of the groove former and preventing setting up of cement on said surfaces, the body having an inlet port communicating with the supply means and channel and a plurality of exhaust ports in communication with said channel.

8. A groove forming apparatus as defined in claim 1 including plate means overlying the smaller end of the frusto-conical opening of the body to form the end face of the pipe spigot, the plate means having an opening of a smaller size communicating and alined with said body opening, said plate means being rotatable with said body to break the adhesion of the concrete thereto.

9. A groove forming apparatus as defined in claim 8 wherein the means for loosely confining the groove former in the channel of the body permits limited relative rotation thereof as well as frictional engagement with a bottom surface of said channel upon expansion of said groove former, the means for imparting limited rotation to said body and groove former being connected to said groove former whereby the rotation of the latter is transmitted to said body by the frictional contact therebetween.

10. A groove forming apparatus as defined in claim 8 including means for supplying a cleansing fluid to the channel of the body for washing the surfaces thereof as well as of the groove former and preventing setting up of cement on said surfaces, the body having an inlet port communicating with the supply means and channel and a plurality of exhaust ports in communication with said channel.

11. A groove forming apparatus as defined in claim 8 where the body includes a pair of coacting members having contiguous surfaces in which inner annular recesses are provided to form the channel of said body, each of the coacting members having an annular inner surface forming a part of the annular inner face of said body.

12. A groove forming apparatus as defined in claim 1 wherein the channel of the body and the groove former have coacting means for centering said groove former relative to the frusto-conical opening of said body in the contracted and expanded positions of said groove former.

13. A groove forming apparatus as defined in claim 3 wherein the body has at least one annular groove in coextensive communication with the channel to ensure circulation of the cleansing fluid.

14. A groove forming apparatus as defined in claim 1 wherein the means for loosely confining the groove former in the channel of the body includes means projecting from said groove former and having an elongate opening, a pin mounted on said body and engaged in said opening for relative longitudinal movement.

15. A groove forming apparatus as defined in claim 14 including means for supplying a cleansing fluid to the channel of the body for washing the surfaces thereof as well as of the groove former and preventing setting up of cement on said surfaces, the body having an inlet port communicating with the supply means and channel and a plurality of exhaust ports in communication with said channel.

16. A groove forming apparatus as defined in claim 14 including plate means overlying the smaller end of the frusto-conical opening of the body to form the end face of the pipe spigot, the plate means having an opening of smaller size communicating and alined with said body opening, said plate means being rotatable with said body to break the adhesion of the concrete thereof.

17. A groove forming apparatus as defined in claim 14 wherein the means for loosely confining the groove former in the channel of the body permits limited relative rotation thereof as well as frictional engagement with a bottom surface of said channel upon expansion of said groove former, the means for imparting limited rotation to said body and groove former being connected to said groove former whereby the rotation of the latter is transmitted to said body by the frictional contact therebetween.

18. A groove forming apparatus as defined in claim 1 wherein the means for imparting limited rotation to the body and groove former includes means for detachably connecting the groove former to said body and preventing expansion of said groove former so as to permit limited rotation of said body and groove former prior to such expansion, means for disconnecting said groove former from said body upon predetermined rotation thereof to permit expansion of said groove former.

19. A groove forming apparatus as defined in claim 18 wherein the means for detachably connecting the groove former to the body and preventing expansion of said groove former includes handle means connected to one end portion of said groove former, latch means mounted on the handle means, the means for loosely confining said groove former in the channel of said body including means projecting from the other end of said groove former and engageable with the latch means for connection with said handle means, a pin mounted on said body, the projecting means having an elongate opening for engagement by said pin.

20. A groove forming apparatus as defined in claim 18 including means for supplying a cleansing fluid to the channel of the body for washing the surfaces thereof as well as of the groove former and preventing setting up of cement on said surfaces, the body having an inlet port communicating with the supply means and channel and a plurality of exhaust ports in communication with said channel.

21. A groove forming apparatus as defined in claim 18 wherein the body includes a pair of coacting members having contiguous surfaces in which inner annular recesses are provided to form the channel of said body, each of the coacting members having an annular inner surface forming a part of the annular inner face of said body.

22. A groove forming apparatus as defined in claim 18 including plate means overlying the smaller end of the frustoconical opening of the body to form the end face of the pipe spigot, the plate means having an opening of smaller size communicating and alined with said body opening, said plate means being rotatable with said body to break the adhesion of the concrete thereto.

23. A groove forming apparatus as defined in claim 20 wherein the body includes a pair of coacting members having contiguous surfaces in which inner annular recesses are provided to form the channel of said body, each of the coacting members having an annular inner surface forming a part of the annular inner face of said body.

24. A groove forming apparatus as defined in claim 20 including plate means overlying the smaller end of the frustoconical opening of the body to form the end face of the pipe spigot, the plate means having an opening of smaller size communicating and alined with said body opening.

said plate means being rotatable with said body to break the adhesion of the concrete thereto.

25. A groove forming apparatus as defined in claim 19 including means for supplying a cleansing fluid to the channel of the body for washing the surfaces thereof as well as the groove former and preventing setting up of cement on said surfaces, the body having an inlet port communicating with the supply means and channel and a plurality of exhaust ports in communication with said channel.

26. A groove forming apparatus as defined in claim 19 wherein the body includes a pair of coacting members having contiguous surfaces in which inner annular recesses are provided to form the channel of said body, each of the coacting members having an annular inner surface forming a part of the annular inner face of said body.

27. A groove forming apparatus as defined in claim 19 including plate means overlying the smaller end of the frustoconical opening of the body to form the end face of the pipe spigot, the plate means having an opening of smaller size communicating and alined with said body opening, said plate means being rotatable with said body to break the adhesion of the concrete thereto.

28. A groove forming apparatus as defined in claim 1 wherein the body includes a pair of coacting members having contiguous surfaces in which inner annular recesses are provided to form the channel of said body, each of the coacting members having an annular inner surface forming a part of the annular inner face of said body, one of the coacting members being tapered between diametrically opposed high and low points whereby the spigots and grooves formed by said apparatus are at angles to the longitudinal axis of the pipe.

29. A groove forming apparatus as defined in claim 28 including means for supplying a cleansing fluid to the channel of the body for washing the surfaces thereof as well as of the groove former and preventing setting up of cement on said surfaces, the body having an inlet port communicating with the supply means and channel and a plurality of exhaust ports in communication with said channel.

30. A groove forming apparatus as defined in claim 28 wherein the means for loosely confining the groove former in the channel of the body permits limited relative rotation thereof as well as frictional engagement with a bottom surface of said channel upon expansion of said groove former, the means for imparting limited rotation to said body and groove former being connected to said groove former whereby the rotation of the latter is transmitted to said body by the frictional contact therebetween.

31. The method of forming gasket receiving grooves in concrete and similar pipe spigots which includes mounting for rotation about its axis a body having a frusto conical opening extending therethrough to provide an annular inner face for forming the tapered surfaces of pipe spigots, the annular inner face of the body having a peripheral channel for receiving a split annuar groove former of less internal and external diameters, contracting the groove former into groove forming position, supplying concrete to said body to form a grooved spigot, imparting limited rotation to said body and groove former for breaking the adhesion of the concrete thereto, expanding said groove former out of groove forming position, withdrawing said body from the grooved spigot.

32. The method as defined in claim 31 which includes supplying a cleansing fluid to the channel after expanding the groove former out of groove forming position for washing the surfaces thereof and preventing the setting up of cement on said surfaces.

References Cited

UNITED STATES PATENTS 3,069,727  12/1962  Shramek __________ 25—18 X
3,161,936  12/1964  Tiller ______________ 25—39

J. SPENCER OVERHOLSER, Primary Examiner

D. W. JONES, Assistant Examiner

U.S. Cl. X.R.

249—100